US011675430B1

(12) United States Patent
Peuhkurinen et al.

(10) Patent No.: US 11,675,430 B1
(45) Date of Patent: Jun. 13, 2023

(54) DISPLAY APPARATUS AND METHOD INCORPORATING ADAPTIVE GAZE LOCKING

(71) Applicant: Varjo Technologies Oy, Helsinki (FI)

(72) Inventors: Ari Antti Erik Peuhkurinen, Helsinki (FI); Evgeny Zuev, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/553,893

(22) Filed: Dec. 17, 2021

(51) Int. Cl.
*G06F 3/01* (2006.01)
*G06F 3/14* (2006.01)

(52) U.S. Cl.
CPC .......... *G06F 3/013* (2013.01); *G06F 3/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 11,269,406 | B1* | 3/2022 | Sztuk | G06F 3/011 |
| 2017/0294022 | A1* | 10/2017 | Na | G06T 15/00 |
| 2018/0047332 | A1* | 2/2018 | Kuwahara | G09G 3/2096 |
| 2018/0075654 | A1 | 3/2018 | Vembar et al. | |
| 2020/0278746 | A1* | 9/2020 | Lindh | G06T 15/205 |
| 2020/0364901 | A1 | 11/2020 | Choudhuri et al. | |
| 2021/0250257 | A1 | 8/2021 | Ringenberg et al. | |
| 2021/0382316 | A1* | 12/2021 | Gupta | G02B 27/0093 |
| 2022/0187907 | A1* | 6/2022 | Lee | G06F 3/017 |

OTHER PUBLICATIONS

Notification of Transmittal of The International Search Report and The Written Opinion of The International Searching Authority, or The Declaration, Application No. PCT/FI2022/050737, dated Feb. 7, 2023; 15 pages.

* cited by examiner

Primary Examiner — William Boddie
Assistant Examiner — Alecia D English
(74) Attorney, Agent, or Firm — Ziegler IP Law Group, LLC

(57) ABSTRACT

A display apparatus including: light source(s); gaze-tracking means; and processor(s) configured to: determine gaze directions of user's eyes; send, to rendering server, information indicative of gaze direction determined at first time instant; receive image frame(s) generated according to gaze, and being optionally timestamped with second time instant; display image frame(s) at third time instant; determine time lag between any one of: first time instant and third time instant, or second time instant and third time instant; detect whether or not time lag exceeds first predefined threshold; when time lag exceeds first predefined threshold, switch on gaze-lock mode; select forward line of vision as fixed gaze direction; send, to rendering server, information indicative of fixed gaze; and receive image frames generated according to fixed gaze; and display image frames.

24 Claims, 6 Drawing Sheets

DISPLAY APPARATUS AND METHOD INCORPORATING ADAPTIVE GAZE LOCKING

TECHNICAL FIELD

The present disclosure relates to display apparatuses and rendering servers incorporating adaptive gaze locking. The present disclosure also relates to methods implemented by such display apparatuses and such rendering servers for adaptive gaze locking.

BACKGROUND

In recent times, there has been an ever-increasing demand for image generation. For example, such a demand may be quite high and critical in case of evolving technologies such as immersive extended-reality (XR) technologies which are being employed in various fields such as entertainment, real estate, training, medical imaging operations, simulators, navigation, and the like. Such immersive XR technologies create XR environments for presentation to a user of an XR device (such as an XR headset, a pair of XR glasses, or similar).

Some XR devices employ a rendering server (such as a cloud server) for generating images corresponding to an XR environment, and then the generated images are received by such XR devices from the rendering server for subsequent displaying thereon. However, provision of generating images by the rendering server has certain problems associated therewith. These problems can be attributed to delays in generating and/or displaying the images, whilst the user's gaze is constantly changing. Since there is always some delay (for example, due to communication network traffic, high processing time and the like) between measurement of a gaze of the user's eye and generation of an image corresponding to said gaze, it is possible that the gaze of the user's eye might have changed by the time the generated image is ready for displaying. In such a case, the generated image is displayed to the user with a considerable latency, and thus the generated image does not match a latest gaze of the user's eye. Resultantly, this leads to a sub-optimal (i.e., a lack of realism), non-immersive viewing experience for the user when the user views the generated image. Moreover, such delays could cause motion sickness to the user.

Therefore, in light of the foregoing discussion, there exists a need to overcome the aforementioned drawbacks associated with provision of generating and displaying high-quality images in specialized devices.

SUMMARY

The present disclosure seeks to provide a display apparatus incorporating adaptive gaze locking. The present disclosure also seeks to provide a method implemented by such a display apparatus for adaptive gaze locking. The present disclosure seeks to provide a rendering server incorporating adaptive gaze locking. The present disclosure also seeks to provide a method implemented by such a rendering server for adaptive gaze locking. An aim of the present disclosure is to provide a solution that overcomes at least partially the problems encountered in prior art.

In a first aspect, an embodiment of the present disclosure provides a display apparatus comprising:
  at least one light source per eye;
  gaze-tracking means; and
  at least one processor configured to:

process gaze-tracking data, collected by the gaze-tracking means, to determine gaze directions of a user's eyes;
send, to a rendering server, information indicative of a given gaze direction of a given eye determined at a first time instant (T1);
receive, from the rendering server, at least one image frame generated according to the given gaze direction of the given eye, the at least one image frame being optionally timestamped with a second time instant (T2) at which the rendering server generated the at least one image frame;
display the at least one image frame via the at least one light source, the at least one image frame being displayed at a third time instant (T3);
determine a time lag between any one of:
the first time instant (T1) and the third time instant (T3), or
the second time instant (T2) and the third time instant (T3);
detect whether or not the time lag exceeds a first predefined threshold;
when it is detected that the time lag exceeds the first predefined threshold,
switch on a gaze-lock mode of the display apparatus;
select a forward line of vision of the user as a fixed gaze direction, for a given session of the gaze-lock mode;
send, to the rendering server, information indicative of the fixed gaze direction, instead of actual gaze directions of the given eye, during the given session of the gaze-lock mode; and
receive, from the rendering server, a sequence of image frames generated according to the fixed gaze direction during the given session of the gaze-lock mode; and
display the sequence of image frames via the at least one light source.

In a second aspect, an embodiment of the present disclosure provides a method implemented by a display apparatus, the method comprising:
  processing gaze-tracking data, collected by gaze-tracking means of the display apparatus, to determine gaze directions of a user's eyes;
  sending, to a rendering server, information indicative of a given gaze direction of a given eye determined at a first time instant (T1);
  receiving, from the rendering server, at least one image frame generated according to the given gaze direction of the given eye, the at least one image frame being optionally timestamped with a second time instant (T2) at which the rendering server generated the at least one image frame;
  displaying the at least one image frame via at least one light source of the display apparatus, the at least one image frame being displayed at a third time instant (T3);
  determining a time lag between any one of:
  the first time instant (T1) and the third time instant (T3), or the second time instant (T2) and the third time instant (T3);
  detecting whether or not the time lag exceeds a first predefined threshold;
  when it is detected that the time lag exceeds the first predefined threshold,
  switching on a gaze-lock mode of the display apparatus;
  selecting a forward line of vision of the user as a fixed gaze direction, for a given session of the gaze-lock mode;

sending, to the rendering server, information indicative of the fixed gaze direction, instead of actual gaze directions of the given eye, during the given session of the gaze-lock mode; and receiving, from the rendering server, a sequence of image frames generated according to the fixed gaze direction during the given session of the gaze-lock mode; and displaying the sequence of image frames via the at least one light source.

In a third aspect, an embodiment of the present disclosure provides a rendering server configured to:

receive, from a display apparatus, information indicative of a given gaze direction of a given eye of a user determined at a first time instant (T1);

generate at least one image frame according to the given gaze direction of the given eye, the at least one image frame being optionally timestamped with a second time instant (T2) at which the rendering server generated the at least one image frame;

send the at least one image frame to the display apparatus for display thereat, the at least one image frame being sent at a fourth time instant (T4);

determine a time lag between any one of:

the first time instant (T1) and the second time instant (T2), or the first time instant (T1) and the fourth time instant (T4);

detect whether or not the time lag exceeds a third predefined threshold;

when it is detected that the time lag exceeds the third predefined threshold, switch on a gaze-lock mode for the display apparatus;

select a forward line of vision of the user as a fixed gaze direction, for a given session of the gaze-lock mode; and generate a sequence of image frames according to the fixed gaze direction, instead of actual gaze directions of the given eye, during the given session of the gaze-lock mode; and send the sequence of image frames to the display apparatus for display thereat.

In a fourth aspect, an embodiment of the present disclosure provides a method implemented by a rendering server, the method comprising:

receiving, from a display apparatus, information indicative of a given gaze direction of a given eye of a user determined at a first time instant (T1);

generating at least one image frame according to the given gaze direction of the given eye, the at least one image frame being optionally timestamped with a second time instant (T2) at which the rendering server generated the at least one image frame;

sending the at least one image frame to the display apparatus for display thereat, the at least one image frame being sent at a fourth time instant (T4), determining a time lag between any one of:

the first time instant (T1) and the second time instant (T2), or the first time instant (T1) and the fourth time instant (T4);

detecting whether or not the time lag exceeds a third predefined threshold;

when it is detected that the time lag exceeds the third predefined threshold, switching on a gaze-lock mode for the display apparatus;

selecting a forward line of vision of the user as a fixed gaze direction, for a given session of the gaze-lock mode; and generating a sequence of image frames according to the fixed gaze direction, instead of actual gaze directions of the given eye, during the given session of the gaze-lock mode; and sending the sequence of image frames to the display apparatus for display thereat.

Embodiments of the present disclosure substantially eliminate or at least partially address the aforementioned problems in the prior art, and enable displaying of realistic, high-quality foveated image frames that are generated (by the rendering server) according to a user's gaze in real time or according to adaptive gaze locking, when required.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3B illustrates an exemplary transition from a current gaze direction of the given eye to the fixed gaze direction of the given eye, while

Figure 1:
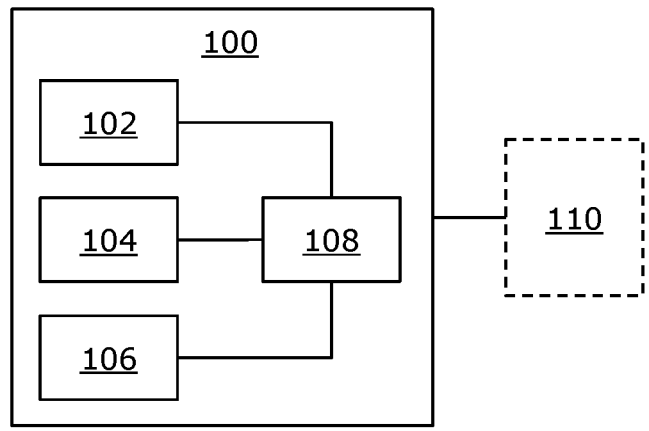
FIG. 1 illustrates a block diagram of architecture of a display apparatus incorporating adaptive gaze locking, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display apparatus comprising:
at least one light source per eye;
gaze-tracking means; and
at least one processor configured to:
process gaze-tracking data, collected by the gaze-tracking means, to determine gaze directions of a user's eyes;
send, to a rendering server, information indicative of a given gaze direction of a given eye determined at a first time instant (T1);
receive, from the rendering server, at least one image frame generated according to the given gaze direction of the given eye, the at least one image frame being optionally timestamped with a second time instant (T2) at which the rendering server generated the at least one image frame;
display the at least one image frame via the at least one light source, the at least one image frame being displayed at a third time instant (T3);
determine a time lag between any one of:
the first time instant (T1) and the third time instant (T3), or
the second time instant (T2) and the third time instant (T3);
detect whether or not the time lag exceeds a first predefined threshold;
when it is detected that the time lag exceeds the first predefined threshold,
switch on a gaze-lock mode of the display apparatus;
select a forward line of vision of the user as a fixed gaze direction, for a given session of the gaze-lock mode;
send, to the rendering server, information indicative of the fixed gaze direction, instead of actual gaze directions of the given eye, during the given session of the gaze-lock mode; and
receive, from the rendering server, a sequence of image frames generated according to the fixed gaze direction during the given session of the gaze-lock mode; and
display the sequence of image frames via the at least one light source.

In a second aspect, an embodiment of the present disclosure provides a method implemented by a display apparatus, the method comprising:
processing gaze-tracking data, collected by gaze-tracking means of the display apparatus, to determine gaze directions of a user's eyes;
sending, to a rendering server, information indicative of a given gaze direction of a given eye determined at a first time instant (T1);
receiving, from the rendering server, at least one image frame generated according to the given gaze direction of the given eye, the at least one image frame being optionally timestamped with a second time instant (T2) at which the rendering server generated the at least one image frame;
displaying the at least one image frame via at least one light source of the display apparatus, the at least one image frame being displayed at a third time instant (T3);
determining a time lag between any one of:
the first time instant (T1) and the third time instant (T3), or
the second time instant (T2) and the third time instant (T3);
detecting whether or not the time lag exceeds a first predefined threshold;
when it is detected that the time lag exceeds the first predefined threshold,
switching on a gaze-lock mode of the display apparatus;
selecting a forward line of vision of the user as a fixed gaze direction, for a given session of the gaze-lock mode;
sending, to the rendering server, information indicative of the fixed gaze direction, instead of actual gaze directions of the given eye, during the given session of the gaze-lock mode; and
receiving, from the rendering server, a sequence of image frames generated according to the fixed gaze direction during the given session of the gaze-lock mode; and
displaying the sequence of image frames via the at least one light source.

In a third aspect, an embodiment of the present disclosure provides a rendering server configured to:
receive, from a display apparatus, information indicative of a given gaze direction of a given eye of a user determined at a first time instant (T1);
generate at least one image frame according to the given gaze direction of the given eye, the at least one image frame being optionally timestamped with a second time instant (T2) at which the rendering server generated the at least one image frame;
send the at least one image frame to the display apparatus for display thereat, the at least one image frame being sent at a fourth time instant (T4);
determine a time lag between any one of:
the first time instant (T1) and the second time instant (T2), or
the first time instant (T1) and the fourth time instant (T4);
detect whether or not the time lag exceeds a third predefined threshold;
when it is detected that the time lag exceeds the third predefined threshold,
switch on a gaze-lock mode for the display apparatus;
select a forward line of vision of the user as a fixed gaze direction, for a given session of the gaze-lock mode; and
generate a sequence of image frames according to the fixed gaze direction, instead of actual gaze directions of the given eye, during the given session of the gaze-lock mode; and
send the sequence of image frames to the display apparatus for display thereat.

In a fourth aspect, an embodiment of the present disclosure provides a method implemented by a rendering server, the method comprising:
receiving, from a display apparatus, information indicative of a given gaze direction of a given eye of a user determined at a first time instant (T1);
generating at least one image frame according to the given gaze direction of the given eye, the at least one image frame being optionally timestamped with a second time instant (T2) at which the rendering server generated the at least one image frame;

sending the at least one image frame to the display apparatus for display thereat, the at least one image frame being sent at a fourth time instant (T4);

determining a time lag between any one of:
the first time instant (T1) and the second time instant (T2), or
the first time instant (T1) and the fourth time instant (T4);

detecting whether or not the time lag exceeds a third predefined threshold;

when it is detected that the time lag exceeds the third predefined threshold, switching on a gaze-lock mode for the display apparatus;

selecting a forward line of vision of the user as a fixed gaze direction, for a given session of the gaze-lock mode; and generating a sequence of image frames according to the fixed gaze direction, instead of actual gaze directions of the given eye, during the given session of the gaze-lock mode; and sending the sequence of image frames to the display apparatus for display thereat.

The present disclosure provides the aforementioned display apparatus, the aforementioned method implemented by such a display apparatus, the aforementioned rendering server, and the aforementioned method implemented by such a rendering server, for generating realistic and high-quality image frames, by way of using adaptive gaze locking. Beneficially, the time delay is compared with predefined threshold(s), to selectively switch on the gaze-lock mode. When the gaze-lock mode is switched on, image frames are generated (by the rendering server) according to the fixed gaze direction (that corresponds to a central region of a field of view of the user's eyes) instead of the actual gaze directions. Therefore, the image frames are generated either according to the user's gaze in real time or near real time, i.e., with minimal latency, or according to the adaptive gaze locking, when required. Resultantly, upon displaying, the image frames provide an optimal (i.e., realistic), immersive viewing experience to the user without causing any motion sickness. The methods are fast, effective, reliable and can be implemented with ease.

Notably, according to the aforementioned first aspect and the aforementioned second aspect, the display apparatus (or in particular, the at least one processor of the display apparatus) determines the time lag and decides to switch on the gaze-lock mode. Furthermore, according to the aforementioned third aspect and the aforementioned fourth aspect, the rendering server determines the time lag and decides to switch on the gaze-lock mode.

Optionally, when the time lag does not exceed the first predefined threshold or the third predefined threshold, the gaze-lock mode is not switched on (namely, is disabled). In the first aspect, optionally, the at least one processor is configured to, when it is detected that the time lag does not exceed the first predefined threshold, send, to the rendering server, information indicative of the actual gaze directions of the given eye; and receive, from the rendering server, a sequence of image frames generated according to the actual gaze directions of the given eye.

In the third aspect, optionally, the rendering server is further configured to, when it is detected that the time lag does not exceed the third predefined threshold, receive, from the display apparatus, information indicative of actual gaze directions of the given eye; and generate the sequence of image frames according to the actual gaze directions of the given eye.

Upon receiving the sequence of image frames (that are generated based on the fixed gaze direction or using the actual gaze directions), the at least one processor displays the sequence of image frames via the at least one light source.

Throughout the present disclosure, the term "display apparatus" refers to a specialized equipment that is capable of at least displaying image frames. A given image frame is to be presented to a user of the display apparatus. Optionally, the display apparatus is implemented as a head-mounted display (HMD) device. The term "head-mounted display" refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. In this regard, the given image frame is utilized for generating the visual scene of the XR environment. The term "extended-reality" encompasses virtual reality (VR), augmented reality (AR), mixed reality (MR), and the like.

In one implementation, the display apparatus is implemented as the HMD and a computing device coupled to the HMD. In one case, the HMD comprises the at least one light source per eye and the gaze-tracking means, while the computing device comprises the at least one processor. Therefore, computational tasks pertaining to presentation of the XR environment are entirely performed at the computing device, by the at least one processor. In another case, the HMD comprises the at least one light source per eye and the gaze-tracking means, and the at least one processor is implemented at both the HMD and the computing device. Therefore, computational tasks pertaining to presentation of the XR environment are performed in a shared manner at both the HMD and the computing device, by the at least one processor. The computing device may be communicably coupled to the HMD, wirelessly and/or in a wired manner. Examples of the computing device include, but are not limited to, a computer, a laptop, a tablet, a smartphone, a workstation, and an XR console.

In another implementation, the display apparatus is implemented as an HMD. In such an implementation, the HMD comprises the at least one light source per eye, the gaze-tracking means, and the at least one processor. Therefore, computational tasks pertaining to presentation of the XR environment are entirely performed at the HMD, by the at least one processor.

Throughout the present disclosure, the term "light source" refers to an element from which light emanates. Optionally, the at least one light source is implemented as a display. In this regard, the given image frame is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the at least one light source is implemented as a projector. In this regard, the given image frame is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector. The at least one light source could be a single-resolution light source or a multi-resolution light source.

Notably, the at least one processor controls overall operation of the display apparatus. The at least one processor is communicably coupled to the at least one light source and the gaze-tracking means. The at least one processor could be a processor of the HMD and/or a processor of the computing device communicably coupled to the HMD.

Throughout the present disclosure, the term "gaze-tracking means" refers to specialized equipment for detecting and/or following a gaze of the given eye of the user. The term "gaze direction" refers to a direction in which the given eye of the user is gazing. The gaze direction may be represented by a gaze vector. The term "given eye" encompasses a first eye of the user, or a second eye of the user, or both the first eye and the second eye of the user. The first eye is one of a left eye or a right eye of the user, while the second eye is another of the left eye or the right eye of the user.

The gaze-tracking means could be implemented as contact lenses with sensors, cameras monitoring a position, a size and/or a shape of a pupil of the given eye of the user, and the like. Such gaze-tracking means are well-known in the art. The gaze-tracking data may comprise images of the given eye of the user, sensor values, and the like. Optionally, when processing the gaze-tracking data to determine the gaze directions of the user's eyes, the at least one processor is to configured to employ at least one of: an image processing algorithm, a feature extraction algorithm, a data processing algorithm. It will be appreciated that the gaze-tracking data is collected repeatedly by the gaze-tracking means throughout a given session of using the display apparatus, as user's gaze keeps changing whilst he/she uses the display apparatus. An up-to-date gaze-tracking data (indicative of the gaze direction of the given eye) allows for generating up-to-date gaze-contingent image frame(s). It will also be appreciated that gaze-tracking data of a given time instant is indicative of the user's gaze at the given time instant.

Throughout the present disclosure, the term "rendering serve?" refers to hardware, software, firmware or a combination of these that provides functionality by way of resources, data, services or programs to at least one display apparatus. Notably, the rendering server generates image frames for the display apparatus. Optionally, in this regard, the display apparatus (or particularly, the at least one processor of the display apparatus) and the rendering server are communicably coupled to each other, wirelessly and/or in a wired manner. Optionally, the rendering server is implemented as a cloud server.

The information indicative of the given gaze direction of the given eye is required by the rendering server to generate the at least one image frame. It will be appreciated that such an information is sent to the rendering server throughout the given session of using the display apparatus, in order to enable the rendering server to generate up-to-date gaze-contingent image frame(s) throughout the given session. Since the at least one processor determines the gaze directions of the user's eyes, information pertaining to the first time instant 'T1' (i.e., a time instant at which the given gaze direction of the given eye is determined) is accurately known to the at least one processor.

Optionally, when generating a given image frame according to the given gaze direction of the given eye, the rendering server maps the given gaze direction to a corresponding region in the visual scene of the XR environment. Said corresponding region is represented in the given image frame at a higher angular resolution as compared to a remaining region that surrounds the corresponding region in the visual scene.

Optionally, in this regard, the given image frame comprises a first region corresponding to the given gaze direction of the given eye and a second region surrounding the first region, wherein an angular resolution of the first region is higher than an angular resolution of the second region. In this regard, the first region is a region of interest within the given image frame, towards which the user's gaze is directed (namely, focused) when the user views the visual scene. The second region is a remaining region of the given image frame that surrounds the first region. The term "angular resolution" of a given region of the given image frame refers to a number of pixels per degree (also referred to as points per degree (PPD)) in the given region. In other words, an angular resolution of the given region of the given image frame refers to a pixel density in the given region. It will be appreciated that a high angular resolution of the given region is indicative of a high visual detail of the given region, and vice-versa. The given image frame (generated by the rendering server according to the given gaze direction) has a variable angular resolution as the angular resolution of the first region is higher than the angular resolution of the second region. The variable angular resolution of the given image frame emulates and approximates human-eye resolution and human-eye foveation properties.

Optionally, the display apparatus further comprises pose-tracking means, wherein the at least one processor is configured to:
  process pose-tracking data, collected by the pose-tracking means, to determine a head pose of the user; and
  send, to the rendering server, information indicative of the head pose of the user determined at the first time instant.

Herein, the term "pose-tracking means" refers to a specialized equipment that is employed to detect and/or follow the head pose of the user within a real-world environment. Moreover, the term "pose" encompasses both position and orientation. The head pose of the user is used to determine a viewpoint and a viewing direction from which the user is viewing a given visual scene of the XR environment at the first time instant. The viewpoint and the viewing direction are indicative of a location and a perspective from which the user views the XR environment. The pose-tracking means may employ an outside-in tracking technique, an inside-out tracking technique, or a combination of both the aforesaid techniques, for collecting the pose-tracking data. Such techniques are well-known in the art. The pose-tracking data may be in form of images, IMU/TIMU values, motion sensor data values, magnetic field strength values, or similar.

Since the rendering server generates the at least one image frame, the second time instant 'T2' (i.e., a time instant at which the at least one image frame is generated) is accurately known to the rendering server. Thus, information indicative of the second time instant is optionally sent (by the rendering server) to the at least one processor, in addition to the at least one image frame so that the at least one processor could determine the time lag, and subsequently switch on or switch off the gaze-lock mode. Optionally, when the at least one image frame is timestamped with the second time instant, the information pertaining to the second time instant is sent to the at least one processor as a metainformation corresponding to the at least one image frame.

The at least one image frame is displayed via the at least one light source. Upon displaying, the at least one image frame is visible to the user. The at least one image frame constitutes the visual scene of the XR environment. Since the at least one processor displays the at least one image frame, the third time instant 'T3' (i.e., a time instant at which the at least one image frame is displayed) is accurately known to the at least one processor.

It will be appreciated that detection of whether or not the time lag exceeds a given predefined threshold (from amongst the first predefined threshold and the third predefined threshold) is performed throughout the given session of using the display apparatus. In the first aspect, optionally, when the at least one processor determines the time lag and decides to switch on the gaze-lock mode of the display apparatus, the time lag refers to any one of:

- a period of time between the first time instant (of determining the given gaze direction of the given eye) and the third time instant (of displaying the at least one image frame), i.e., a round trip time lag, or
- a period of time between the second time instant (of generating the at least one image frame) and the third time instant (of displaying the at least one image frame), i.e., a partial trip time lag.

In such an implementation, the at least one processor is configured to compare the time lag with the first predefined threshold in order to detect whether or not the time lag exceeds the first predefined threshold. Optionally, for the round-trip time lag, the first predefined threshold lies in a range of 50 milliseconds to 200 milliseconds. As an example, for the round-trip time lag, the first predefined threshold may be from 50, 60, 75 or 100 milliseconds up to 100, 125, 150 or 200 milliseconds. Optionally, for the partial-trip time lag, the first predefined threshold lies in a range of 25 milliseconds to 100 milliseconds. As an example, for the partial-trip time lag, the first predefined threshold may be from 25, 30, 40 or 50 milliseconds up to 40, 60, 80 or 100 milliseconds.

Similarly, in the third aspect, optionally, when the rendering server determines the time lag and decides to switch on the gaze-lock mode of the display apparatus, the time lag refers to any one of:

- a period of time between the first time instant (of determining the given gaze direction of the given eye) and the second time instant (of generating the at least one image frame), i.e., a partial trip time lag, or
- a period of time between the first time instant (of determining the given gaze direction of the given eye) and the fourth time instant (of sending the at least one image frame to the display apparatus), i.e., a round trip time lag.

Notably, in such an implementation, the rendering server is configured to compare the time lag with the third predefined threshold in order to detect whether or not the time lag exceeds the third predefined threshold. Optionally, for the round-trip time lag, the third predefined threshold lies in a range of 50 milliseconds to 200 milliseconds. As an example, for the round-trip time lag, the third predefined threshold may be from 50, 60, 75 or 100 milliseconds up to 100, 125, 150 or 200 milliseconds. Optionally, for the partial-trip time lag, the third predefined threshold lies in a range of 25 milliseconds to 100 milliseconds. As an example, for the partial-trip time lag, the first predefined threshold may be from 25, 30, 40 or 50 milliseconds up to 40, 60, 80 or 100 milliseconds.

When the time lag exceeds the first predefined threshold or the third predefined threshold depending the implementation, the gaze-lock mode is switched on (namely, enabled). Throughout the present disclosure, the term "gaze-lock mode" refers to an operational mode of the display apparatus, wherein the given gaze direction of the given eye is fixed along the forward line of vision of the user, for the given session of the gaze-lock mode, and the sequence of image frames are generated according to the fixed gaze direction, during the given session. Beneficially, the time delay is compared with the aforesaid predefined threshold(s), to selectively switch on the gaze-lock mode of the display apparatus.

Notably, the phrase "forward line of vision" of the user refers to a straight line of vision in front of the user's eyes pointing towards a central region of a field of view of the user. The reason for fixing the user's gaze towards the central region (during the given session of the gaze-lock mode) is that the user's gaze is generally directed towards a centre of his/her field of view. When the user wishes to view objects in a periphery of his/her field of view, the user typically turns his/her head in a manner that said objects lie at a centre of his/her current field of view. In such a case, the central region of the field of view of the user is resolved to a much greater degree of visual detail by visual system of the user's eyes, as compared to a peripheral region of the field of view of the user. Optionally, an angular width of the central region of the field of view of the user lies in a range of 0 degree to 5 degrees. The central region could be a user-specific region, based on a user's preference or an ophthalmic problem associated with the user's eyes. A user's natural preference may be such that the central region lies exactly at a center of the field of view. However, due to the ophthalmic problem, the user's preference may be such that the central region may not lie exactly at the center of the field of view. Such an ophthalmic problem can be diagnosed (for example, by an ophthalmologist) for a given eye of the user, or during calibration of the gaze-tracking means.

Since during the given session of the gaze-lock mode, the image frames are generated based on the fixed gaze direction that is locked at the central region of the field of view of the user, the first region and the second region of the given image frame (from amongst the sequence of image frames) are determined according to the central region of the field of view of the user. Such a manner of determining the first region and the second region emulates a way in which users generally focus within their field of view.

It will be appreciated that when the gaze-lock mode is switched off, the first region and the second region of the given image frame (from amongst the sequence of image frames) are determined dynamically based on a given actual gaze direction. Such a dynamic manner of determining the first region and the second region of the given image frame emulates a way in which the user actively focuses within his/her field of view.

In the first aspect, optionally, the at least one processor is configured to switch on the gaze-lock mode of the display apparatus only when it is detected that the time lag has been exceeding the first predefined threshold over a predefined time period. In the third aspect, optionally, the rendering server is configured to switch on the gaze-lock mode for the display apparatus only when it is detected that the time lag has been exceeding the third predefined threshold over a predefined time period.

Accordingly, the gaze-lock mode would be switched on only when the time lag is repeatedly (namely, continuously) exceeding the first predefined threshold or the third predefined threshold beyond a certain amount of time (i.e., the predefined time period). In other words, when the time lag exceeds the first predefined threshold (or the third predefined threshold) only instantaneously (namely, abruptly), the gaze-lock mode would not be switched on. Thus, for the gaze-lock mode to be switched on, the time lag should remain greater than the first predefined threshold or the third predefined threshold over the predefined time period. Optionally, the predefined time period lies in a range of 500 milliseconds to 2000 milliseconds. As an example, the predefined time period may be from 500, 600, 800, 1000 or 1300 milliseconds up to 1000, 1500 or 2000 milliseconds.

In the first aspect, optionally, the at least one processor is configured to:
  detect, after the gaze-lock mode is switched on, whether or not a current time lag exceeds a second predefined threshold; and
  when it is detected, after the gaze-lock mode is switched on, that the current time lag does not exceed the second predefined threshold, switch off the gaze-lock mode of the display apparatus and end the given session of the gaze-lock mode.

In an embodiment, the second predefined threshold is same as the first predefined threshold. In other words, the second predefined threshold is equal to the first predefined threshold. In another embodiment, the second predefined threshold is different from the first predefined threshold. In one case, the second predefined threshold is lesser than the first predefined threshold. Optionally, in such a case, the second predefined threshold lies in a range of 50 milliseconds to 200 milliseconds. As an example, the first predefined threshold may be 100 milliseconds, whereas the second predefined threshold may be 80 milliseconds. In another case, the second predefined threshold is greater than the first predefined threshold. Optionally, in such a case, the second predefined threshold lies in a range of 50 milliseconds to 200 milliseconds. As an example, the first predefined threshold may be 100 milliseconds, whereas the second predefined threshold may be 120 milliseconds.

In the third aspect, optionally, the rendering server is further configured to:
  detect, after the gaze-lock mode is switched on, whether or not a current time lag exceeds a fourth predefined threshold; and
  when it is detected, after the gaze-lock mode is switched on, that the current time lag does not exceed the fourth predefined threshold, switch off the gaze-lock mode for the display apparatus and end the given session of the gaze-lock mode.

In an embodiment, the fourth predefined threshold is same as the third predefined threshold. In other words, the fourth predefined threshold is equal to the third predefined threshold. In another embodiment, the fourth predefined threshold is different from the third predefined threshold. In one case, the fourth predefined threshold is lesser than the third predefined threshold. Optionally, in such a case, the fourth predefined threshold lies in a range of 50 milliseconds to 200 milliseconds. As an example, the third predefined threshold may be 120 milliseconds, whereas the fourth predefined threshold may be 100 milliseconds. In another case, the fourth predefined threshold is greater than the third predefined threshold. Optionally, in such a case, the fourth predefined threshold lies in a range of 50 milliseconds to 200 milliseconds. As an example, the third predefined threshold may be 160 milliseconds, whereas the fourth predefined threshold may be 180 milliseconds.

Accordingly, the at least one processor or the rendering server compares the current time lag with at least one previous time lag, in order to ascertain whether the current time lag is increased or decreased as compared to the at least one previous time lag, and to accordingly switch off the gaze-lock mode and end the given session of the gaze-lock mode. When the gaze-lock mode is switched off, the sequence of image frames are generated according to the actual gaze directions of the given eye.

In the first aspect, optionally, the at least one processor is configured to switch off the gaze-lock mode of the display apparatus only when it is detected that the time lag has not been exceeding the second predefined threshold over a predefined time period. In the third aspect, optionally, the rendering server is configured to switch off the gaze-lock mode of the display apparatus only when it is detected that the time lag has not been exceeding the fourth predefined threshold over the predefined time period.

Accordingly, the gaze-lock mode would be switched off only when the time lag is repeatedly lesser than the second predefined threshold or the fourth predefined threshold beyond the predefined time period. In other words, when the time lag is lesser than the second predefined threshold or the fourth predefined threshold only instantaneously, the gaze-lock mode would not be switched off (i.e., the gaze-lock mode would remain switched on). Thus, for the gaze-lock mode to be switched off, the time lag should remain lesser than the second predefined threshold (or the fourth predefined threshold) over the predefined time period.

Furthermore, optionally, the at least one processor is configured to employ a smoothening function to smoothen a transition from a current gaze direction of the given eye to the fixed gaze direction, wherein the smoothening function is employed over a first time period at a beginning of the given session of the gaze-lock mode. In this regard, the smoothening function enables in gradually changing the gaze direction of the given eye from the current gaze direction to the fixed gaze direction and thus, facilitating a smooth (i.e., non-drastic) transition from the gaze-lock mode being switched off to the gaze-lock mode being switched on, over the first time period. The first time period is selected such that the gaze-lock mode of the display apparatus is switched on gradually without the user perceiving the aforesaid (gaze-shifting) transition. The first time period may be either system defined, or user defined. In an embodiment, the first time period lies in a range of 10 milliseconds to 100 milliseconds. As an example, the first time period may be from 10, 20, 30, 50 or 70 milliseconds up to 50, 75 or 100 milliseconds.

The "smoothening function" may be a mathematical function that is employed to smoothen the transition from the current gaze direction of to the fixed gaze direction, or vice versa. Such a mathematical function may be based on an easing curve, for example, a linear easing curve, an in-out-quad easing curve, an in-out-quint easing curve, an in-out-cubic easing curve, or similar. The smoothening function may, for example, be employed to determine a weighted sum or a weighted average of coordinates of a current gaze position (corresponding to the current gaze direction) and a fixed gaze position (corresponding to the fixed gaze direction). In such a case, different weight factors (for example, ranging from 0 to 1) could be applied to the coordinates of the current gaze position and the coordinates of the fixed gaze position, over a given time period.

In an example, when the smoothening function is employed to determine the weighted average and is employed to smoothen the transition from the current gaze direction to the fixed gaze direction, the weight factor of the coordinates of the current gaze position may decrease (for example, from 1 to 0) and the weight factor of the coordinates of the fixed gaze position may increase (for example, from 0 to 1), on going from the current gaze direction towards the fixed gaze direction.

Alternatively or additionally, optionally, the at least one processor is configured to employ a smoothening function to smoothen a transition from the fixed gaze direction to a current gaze direction of the given eye, wherein the smoothening function is employed over a second time period prior to ending the given session of the gaze-lock mode. In this regard, the smoothening function enables in gradually changing the gaze direction of the given eye from the fixed gaze direction to the current gaze direction and thus, facilitating a smooth transition from the gaze-lock mode being switched on to the gaze-lock mode being switched off, over the second time period. The second time period is selected such that the gaze-lock mode of the display apparatus is switched off gradually without the user perceiving the aforesaid (gaze-shifting) transition. The second time period may be either system defined, or user defined. Optionally, the second time period lies in a range of 10 milliseconds to 100 milliseconds. As an example, the second time period may be from 10, 20, 30, 50 or 70 milliseconds up to 50, 75 or 100 milliseconds.

In an example, when the smoothening function is employed to determine the weighted average and is employed to smoothen the transition from the fixed gaze direction to the current gaze direction, the weight factor of the coordinates of the fixed gaze position may decrease (for example, from 1 to 0) and the weight factor of the coordinates of the current gaze position may increase (for example, from 0 to 1), on going from the fixed gaze direction towards the current gaze direction.

The present disclosure also relates to the rendering server as described above. Various embodiments and variants disclosed above, with respect to the aforementioned first aspect, apply mutatis mutandis to the rendering server.

Optionally, the rendering server is further configured to employ a smoothening function to smoothen a transition from a current gaze direction of the given eye to the fixed gaze direction, wherein the smoothening function is employed over a first time period at a beginning of the given session of the gaze-lock mode.

Optionally, the rendering server is further configured to employ a smoothening function to smoothen a transition from the fixed gaze direction to a current gaze direction of the given eye, wherein the smoothening function is employed over a second time period prior to ending the given session of the gaze-lock mode.

The present disclosure also relates to the method implemented by the display apparatus as described above. Various embodiments and variants disclosed above, with respect to the aforementioned first aspect, apply mutatis mutandis to the method.

Optionally, the method further comprises, when it is detected that the time lag does not exceed the first predefined threshold,
  sending, to the rendering server, information indicative of the actual gaze directions of the given eye; and
  receiving, from the rendering server, a sequence of image frames generated according to the actual gaze directions of the given eye.
Optionally, the method further comprises:
  detecting, after the gaze-lock mode is switched on, whether or not a current time lag exceeds a second predefined threshold; and
  when it is detected, after the gaze-lock mode is switched on, that the current time lag does not exceed the second predefined threshold, switching off the gaze-lock mode of the display apparatus and ending the given session of the gaze-lock mode.

Optionally, the method further comprises switching on the gaze-lock mode of the display apparatus only when it is detected that the time lag has been exceeding the first predefined threshold over a predefined time period.

Optionally, the method further comprises employing a smoothening function to smoothen a transition from a current gaze direction of the given eye to the fixed gaze direction, wherein the smoothening function is employed over a first time period at a beginning of the given session of the gaze-lock mode.

Optionally, the method further comprises employing a smoothening function to smoothen a transition from the fixed gaze direction to a current gaze direction of the given eye, wherein the smoothening function is employed over a second time period prior to ending the given session of the gaze-lock mode.

Optionally, in the method, a given image frame comprises a first region corresponding to a given gaze direction and a second region surrounding the first region, wherein an angular resolution of the first region is higher than an angular resolution of the second region.

The present disclosure also relates to the method implemented by the rendering server as described above. Various embodiments and variants disclosed above, with respect to the aforementioned third aspect, apply mutatis mutandis to the method.

Optionally, the method further comprises, when it is detected that the time lag does not exceed the third predefined threshold,
  receiving, from the display apparatus, information indicative of the actual gaze directions of the given eye; and
  generating a sequence of image frames according to the actual gaze directions of the given eye.
Optionally, the method further comprises:
  detecting, after the gaze-lock mode is switched on, whether or not a current time lag exceeds a fourth predefined threshold; and
  when it is detected, after the gaze-lock mode is switched on, that the current time lag does not exceed the fourth predefined threshold, switching off the gaze-lock mode for the display apparatus and ending the given session of the gaze-lock mode.

Optionally, the method further comprises switching on the gaze-lock mode for the display apparatus only when it is detected that the time lag has been exceeding the third predefined threshold over a predefined time period.

Optionally, the method further comprises employing a smoothening function to smoothen a transition from a current gaze direction of the given eye to the fixed gaze direction, wherein the smoothening function is employed over a first time period at a beginning of the given session of the gaze-lock mode.

Optionally, the method further comprises employ a smoothening function to smoothen a transition from the fixed gaze direction to a current gaze direction of the given eye, wherein the smoothening function is employed over a second time period prior to ending the given session of the gaze-lock mode.

DETAILED DESCRIPTION OF THE DRAWINGS

Referring to FIG. 1, illustrated is a block diagram of architecture of a display apparatus 100 incorporating adaptive gaze locking, in accordance with an embodiment of the present disclosure. The display apparatus 100 comprises at least one light source per eye (depicted as a light source 102 for a left eye and a light source 104 for a right eye), gaze-tracking means 106, and at least one processor (depicted as a processor 108). The processor 108 is communicably coupled to the light source 102, the light source 104, and the gaze-tracking means 106. The display apparatus 100 is communicably coupled to a rendering server 110.

It may be understood by a person skilled in the art that the FIG. 1 includes a simplified architecture of the display apparatus 100 for sake of clarity, which should not unduly limit the scope of the claims herein. The person skilled in the art will recognize many variations, alternatives, and modifications of embodiments of the present disclosure.

Figure 2:
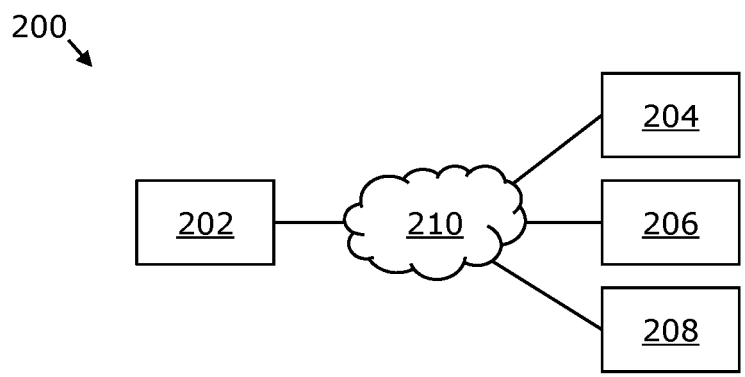
FIG. 2 illustrates an exemplary network environment in which adaptive gaze locking can be incorporated, in accordance with an embodiment of the present disclosure.

Referring to FIG. 2, illustrated is an exemplary network environment 200 in which adaptive gaze locking can be incorporated, in accordance with an embodiment of the present disclosure. In the network environment 200, a rendering server 202 is coupled to at least one display apparatus (depicted as, display apparatuses 204, 206, and 208) via a communication network 210.

Figure 3A:
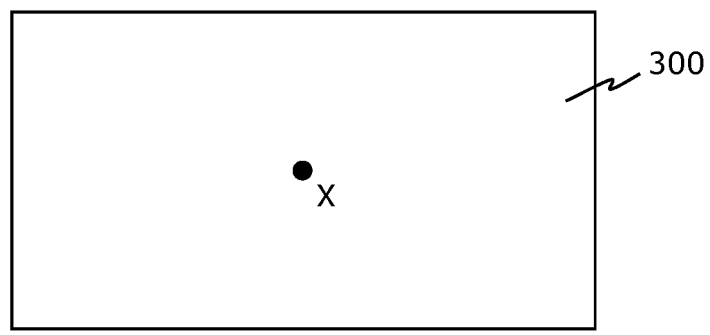
FIG. 3A illustrates a fixed gaze position corresponding to a fixed gaze direction of a given eye in a field of view of a user.
Figure 3B:
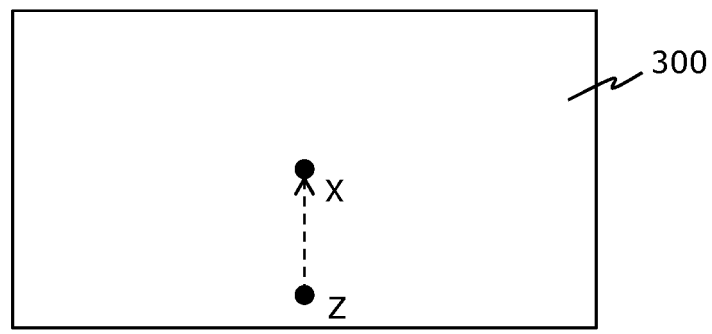
Figure 3C:
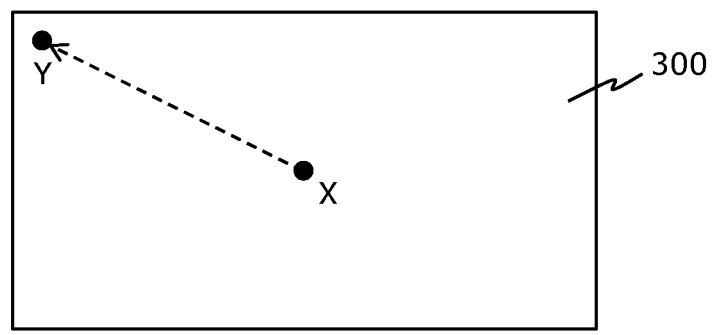
FIG. 3C illustrates an exemplary transition from the fixed gaze direction of the given eye to a current gaze direction of the given eye, in accordance with an embodiment of the present disclosure.

FIG. 3A illustrates a fixed gaze position 'X' corresponding to a fixed gaze direction of a given eye (not shown) in a field of view 300 of a user (not shown), FIG. 3B illustrates an exemplary transition from a current gaze direction of the given eye to the fixed gaze direction of the given eye, while FIG. 3C illustrates an exemplary transition from the fixed gaze direction of the given eye to a current gaze direction of the given eye, in accordance with an embodiment of the present disclosure.

In FIG. 3A, the fixed gaze position 'X' lies at a centre of the field of view 300 of the user. The fixed gaze direction is obtained by selecting a forward line of vision of the user that points towards the centre of the field of view 300 of the user and corresponds to a straight line of vision in front of the user.

In FIG. 3B, a current gaze position 'Z' (corresponding to the current gaze direction of the given eye) lies towards a bottom side of the field of view 300 of the user. During the transition from the current gaze direction to the fixed gaze direction, a gaze position is optionally shifted (namely, changed) from the current gaze position 'Z' to the fixed gaze position 'X' in a gradual manner. A dotted arrow is shown to depicted a direction of such shifting. At least one processor (not shown) is configured to employ a smoothening function to smoothen the aforesaid transition.

In FIG. 3C, a current gaze position 'Y' (corresponding to the current gaze direction of the given eye) lies towards a top-left corner of the field of view 300 of the user. During the transition from the fixed gaze direction to the current gaze direction, a gaze position is optionally shifted from the fixed gaze position 'X' to the current gaze position 'Y' in a gradual manner. A dotted arrow is shown to depicted a direction of such shifting. The at least one processor is configured to employ a smoothening function to smoothen the aforesaid transition.

It may be understood by a person skilled in the art that the FIG. 2 and FIGS. 3A-3C are merely examples, which should not unduly limit the scope of the claims herein. The person skilled in the art will recognize many variations, alternatives, and modifications of embodiments of the present disclosure.

Figure 4A:
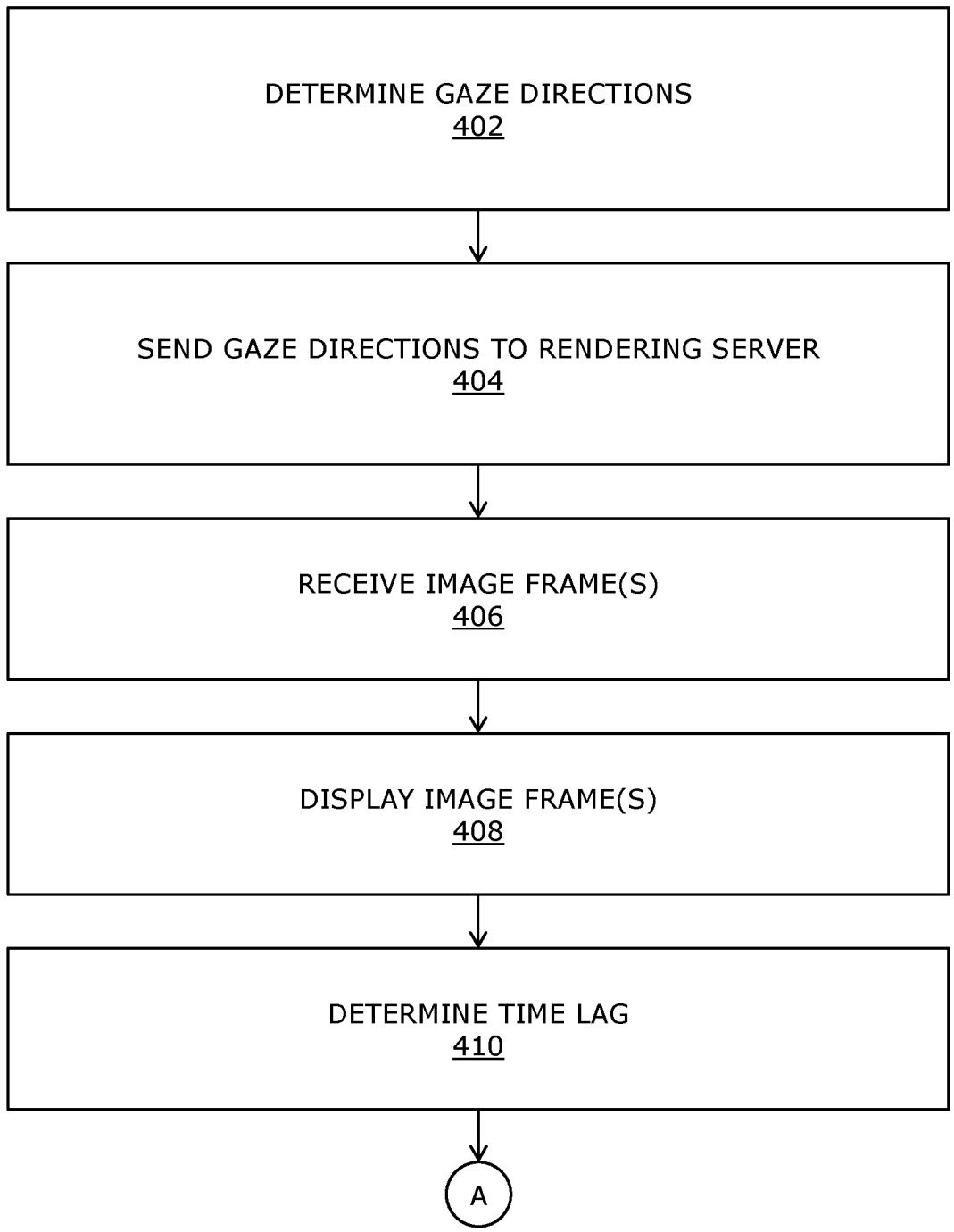
FIGS. 4A and 4B illustrate steps of a method implemented by a display apparatus incorporating adaptive gaze locking, in accordance with an embodiment of the present disclosure.
Figure 4B:
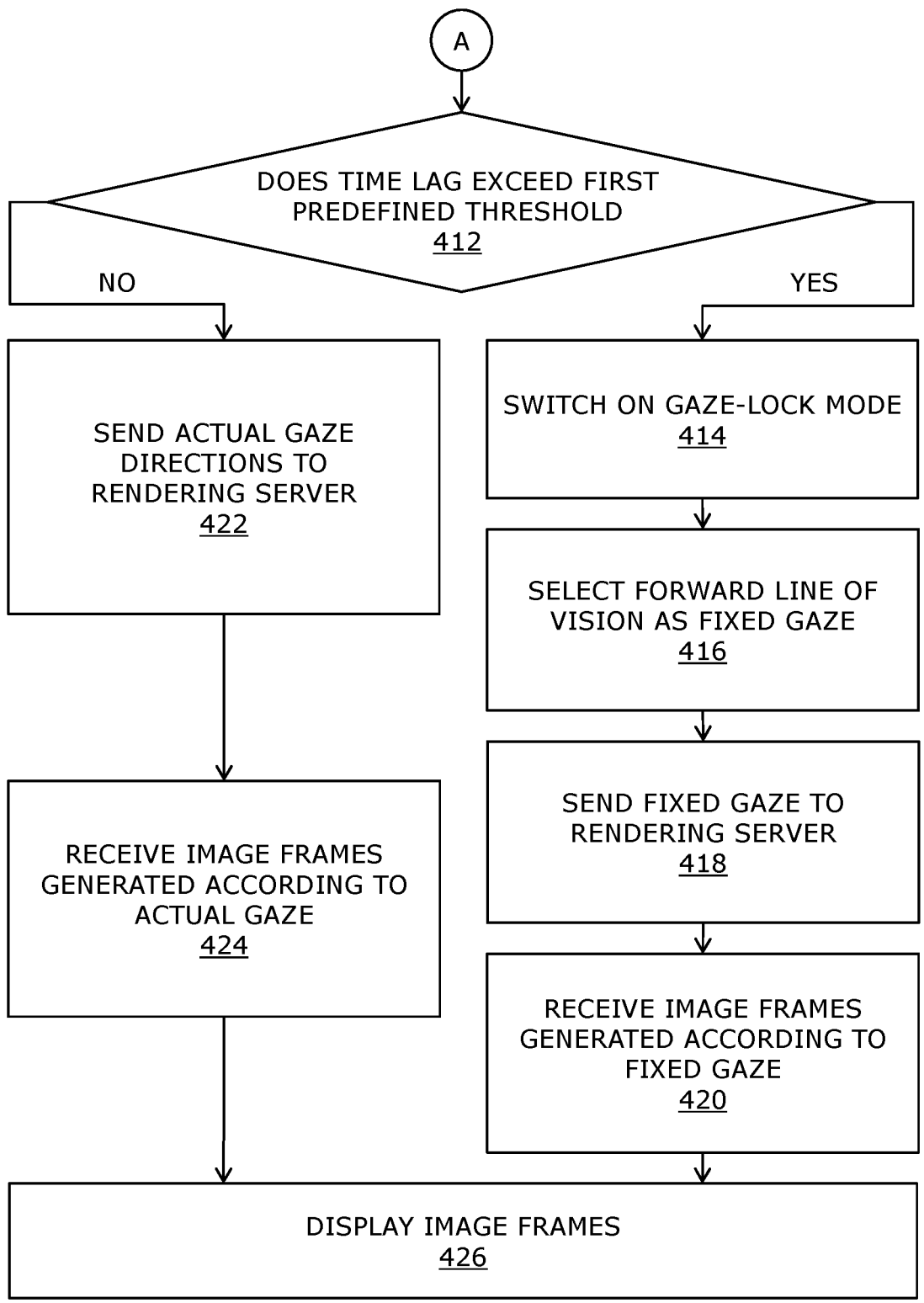

Referring to FIGS. 4A and 4B, illustrated are steps of a method implemented by a display apparatus incorporating adaptive gaze locking, in accordance with an embodiment of the present disclosure. At step 402, gaze-tracking data collected by gaze-tracking means of the display apparatus is processed to determine gaze directions of a user's eyes. At step 404, information indicative of a given gaze direction of a given eye determined at a first time instant (T1) is sent to a rendering server. At step 406, at least one image frame generated according to the given gaze direction of the given eye is received from the rendering server, the at least one image frame being optionally timestamped with a second time instant (T2) at which the rendering server generated the at least one image frame. At step 408, the at least one image frame is displayed via at least one light source of the display apparatus, the at least one image frame being displayed at a third time instant (T3). At step 410, a time lag is determined between any one of: the first time instant (T1) and the third time instant (T3), or the second time instant (T2) and the third time instant (T3). At step 412, it is detected whether or not the time lag exceeds a first predefined threshold. When it is detected that the time lag exceeds the first predefined threshold, at step 414, a gaze-lock mode of the display apparatus is switched on. At step 416, a forward line of vision of the user is selected as a fixed gaze direction, for a given session of the gaze-lock mode. At step 418, information indicative of the fixed gaze direction is sent to the rendering server, instead of actual gaze directions of the given eye, during the given session of the gaze-lock mode. At step 420, a sequence of image frames generated according to the fixed gaze direction are received from the rendering server, during the given session of the gaze-lock mode. Otherwise, when it is detected that the time lag does not exceed the first predefined threshold, at step 422, information indicative of the actual gaze directions of the given eye is sent to the rendering server. At step 424, a sequence of image frames generated according to the actual gaze directions of the given eye are received from the rendering server. Finally, at step 426, the sequence of image frames is displayed via the at least one light source.

The aforementioned steps are only illustrative and other alternatives can also be provided where one or more steps are added, one or more steps are removed, or one or more steps are provided in a different sequence without departing from the scope of the claims herein.

Figure 5A:
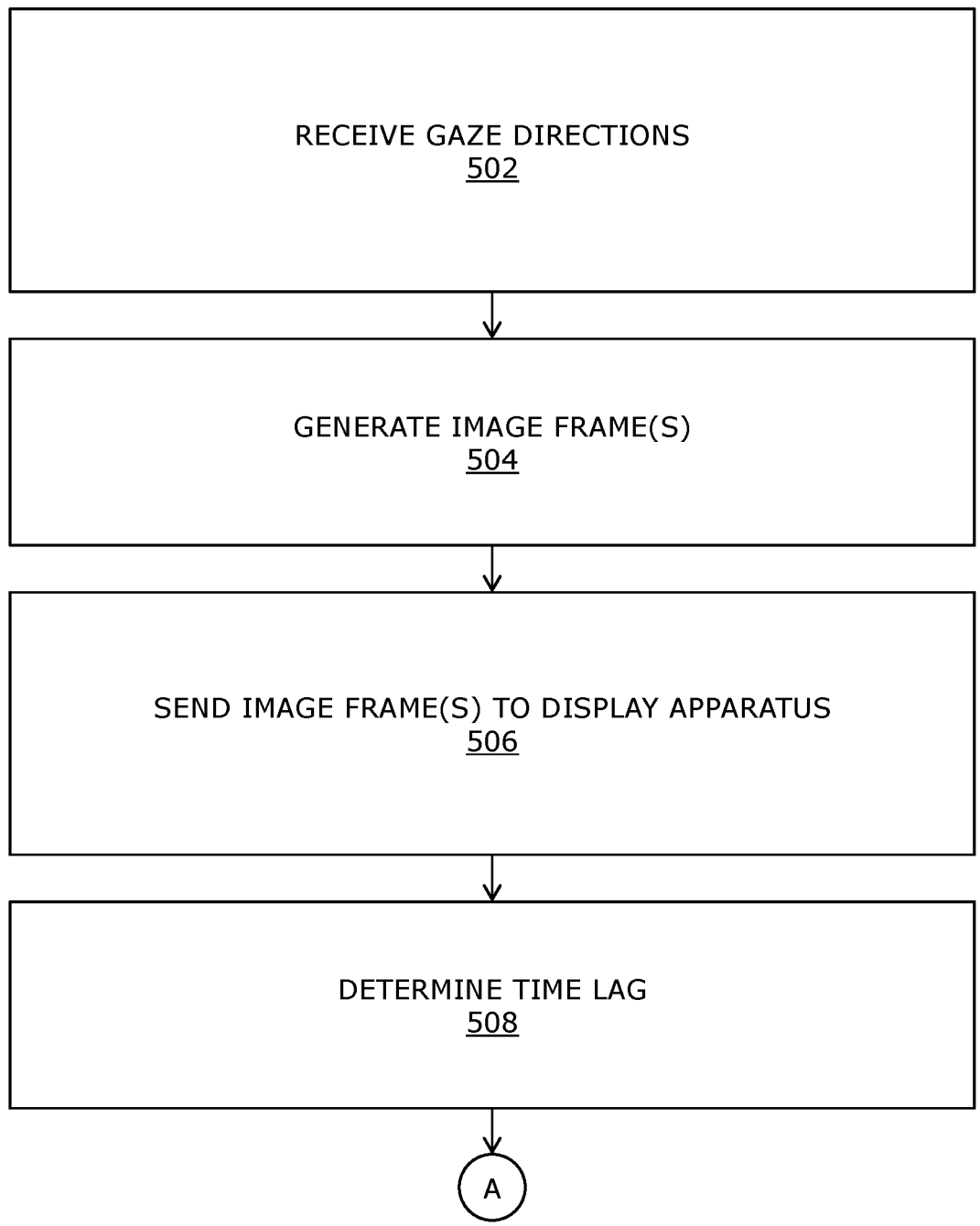
FIGS. 5A and 5B illustrate steps of a method implemented by a rendering server incorporating adaptive gaze locking, in accordance with an embodiment of the present disclosure.
Figure 5B:
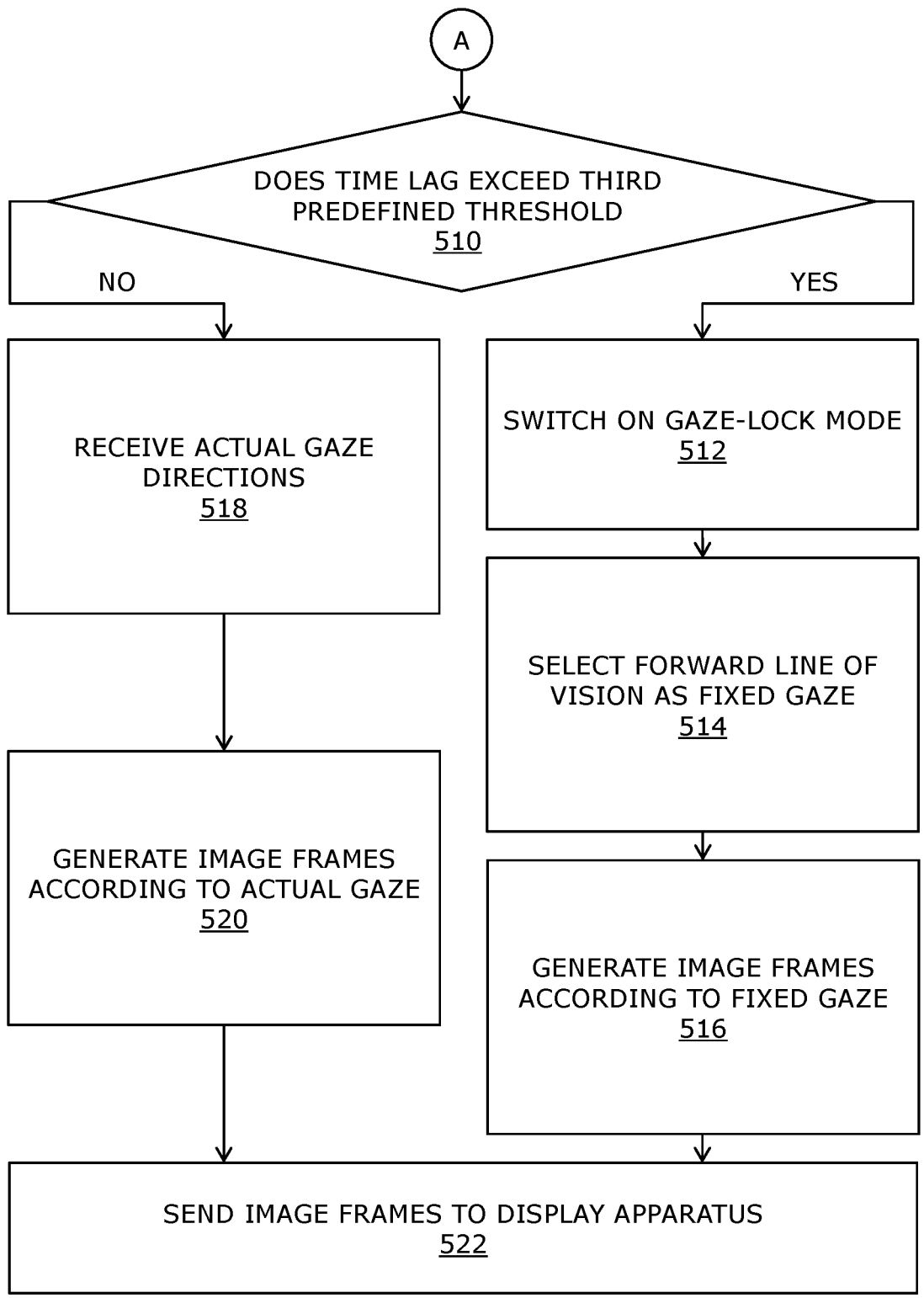

Referring to FIGS. 5A and 5B, illustrated are steps of a method implemented by a rendering server incorporating adaptive gaze locking, in accordance with an embodiment of the present disclosure. At step 502, information indicative of a given gaze direction of a given eye of a user determined at a first time instant (T1) is received from a display apparatus. At step 504, at least one image frame is generated according to the given gaze direction of the given eye, the at least one image frame being optionally timestamped with a second time instant (T2) at which the rendering server generated the at least one image frame. At step 506, the at least one image frame is sent to the display apparatus for display thereat, the at least one image frame being sent at a fourth time instant (T4). At step 508, a time lag is determined between any one of: the first time instant (T1) and the second time instant (T2), or the first time instant (T1) and the fourth time instant (T4). At step 510, it is detected whether or not the time lag exceeds a third predefined threshold. When it is detected that the time lag exceeds the third predefined threshold, at step 512, a gaze-lock mode for the display apparatus is switched on. At step 514, a forward line of vision of the user is selected as a fixed gaze direction, for a given session of the gaze-lock mode. At step 516, a sequence of image frames are generated according to the fixed gaze direction, instead of actual gaze directions of the given eye, during the given session of the gaze-lock mode. Otherwise, when it is detected that the time lag does not exceed the third predefined threshold, at step 518, information indicative of the actual gaze directions of the given eye is received from the display apparatus. At step 520, a sequence of image frames is generated according to the actual gaze directions of the given eye. Finally, at step 522, the sequence of image frames is sent to the display apparatus for display thereat.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A display apparatus comprising:
   at least one light source per eye;
   gaze-tracking means; and
   at least one processor configured to:
      process gaze-tracking data, collected by the gaze-tracking means, to determine gaze directions of a user's eyes;
      send, to a rendering server, information indicative of a given gaze direction of a given eye determined at a first time instant (T1);
      receive, from the rendering server, at least one image frame generated according to the given gaze direction of the given eye, the at least one image frame being timestamped with a second time instant (T2) at which the rendering server generated the at least one image frame;
      display the at least one image frame via the at least one light source, the at least one image frame being displayed at a third time instant (T3);
      determine a time lag between any one of:
         the first time instant (T1) and the third time instant (T3), or
         the second time instant (T2) and the third time instant (T3);
      detect whether or not the time lag exceeds a first predefined threshold;
      when it is detected that the time lag exceeds the first predefined threshold,
         switch on a gaze-lock mode of the display apparatus;
         select a forward line of vision of the user as a fixed gaze direction, for a given session of the gaze-lock mode;
         send, to the rendering server, information indicative of the fixed gaze direction, instead of actual gaze directions of the given eye, during the given session of the gaze-lock mode; and
         receive, from the rendering server, a sequence of image frames generated according to the fixed gaze direction during the given session of the gaze-lock mode; and
      display the sequence of image frames via the at least one light source.

2. The display apparatus of claim 1, wherein the at least one processor is configured to, when it is detected that the time lag does not exceed the first predefined threshold,
   send, to the rendering server, information indicative of the actual gaze directions of the given eye; and
   receive, from the rendering server, a sequence of image frames generated according to the actual gaze directions of the given eye.

3. The display apparatus of claim 1, wherein the at least one processor is configured to:
   detect, after the gaze-lock mode is switched on, whether or not a current time lag exceeds a second predefined threshold; and
   when it is detected, after the gaze-lock mode is switched on, that the current time lag does not exceed the second predefined threshold, switch off the gaze-lock mode of the display apparatus and end the given session of the gaze-lock mode.

4. The display apparatus of claim 1, wherein the at least one processor is configured to switch on the gaze-lock mode of the display apparatus only when it is detected that the time lag has been exceeding the first predefined threshold over a predefined time period.

5. The display apparatus of claim 1, wherein the at least one processor is configured to employ a smoothening function to smoothen a transition from a current gaze direction of the given eye to the fixed gaze direction, wherein the smoothening function is employed over a first time period at a beginning of the given session of the gaze-lock mode.

6. The display apparatus of claim 1, wherein the at least one processor is configured to employ a smoothening function to smoothen a transition from the fixed gaze direction to a current gaze direction of the given eye, wherein the smoothening function is employed over a second time period prior to ending the given session of the gaze-lock mode.

7. A method implemented by a display apparatus, the method comprising:
   processing gaze-tracking data, collected by gaze-tracking means of the display apparatus, to determine gaze directions of a user's eyes;
   sending, to a rendering server, information indicative of a given gaze direction of a given eye determined at a first time instant (T1);
   receiving, from the rendering server, at least one image frame generated according to the given gaze direction of the given eye, the at least one image frame being timestamped with a second time instant (T2) at which the rendering server generated the at least one image frame;
   displaying the at least one image frame via at least one light source of the display apparatus, the at least one image frame being displayed at a third time instant (T3);
   determining a time lag between any one of:
      the first time instant (T1) and the third time instant (T3), or
      the second time instant (T2) and the third time instant (T3);
   detecting whether or not the time lag exceeds a first predefined threshold;
   when it is detected that the time lag exceeds the first predefined threshold,
      switching on a gaze-lock mode of the display apparatus;

selecting a forward line of vision of the user as a fixed gaze direction, for a given session of the gaze-lock mode;

sending, to the rendering server, information indicative of the fixed gaze direction, instead of actual gaze directions of the given eye, during the given session of the gaze-lock mode; and receiving, from the rendering server, a sequence of image frames generated according to the fixed gaze direction during the given session of the gaze-lock mode; and displaying the sequence of image frames via the at least one light source.

8. The method of claim 7, further comprising, when it is detected that the time lag does not exceed the first predefined threshold, sending, to the rendering server, information indicative of the actual gaze directions of the given eye; and receiving, from the rendering server, a sequence of image frames generated according to the actual gaze directions of the given eye.

9. The method of claim 7, further comprising:

detecting, after the gaze-lock mode is switched on, whether or not a current time lag exceeds a second predefined threshold; and when it is detected, after the gaze-lock mode is switched on, that the current time lag does not exceed the second predefined threshold, switching off the gaze-lock mode of the display apparatus and ending the given session of the gaze-lock mode.

10. The method of claim 7, further comprising switching on the gaze-lock mode of the display apparatus only when it is detected that the time lag has been exceeding the first predefined threshold over a predefined time period.

11. The method of claim 7, further comprising employing a smoothening function to smoothen a transition from a current gaze direction of the given eye to the fixed gaze direction, wherein the smoothening function is employed over a first time period at a beginning of the given session of the gaze-lock mode.

12. The method of claim 7, further comprising employing a smoothening function to smoothen a transition from the fixed gaze direction to a current gaze direction of the given eye, wherein the smoothening function is employed over a second time period prior to ending the given session of the gaze-lock mode.

13. A rendering server configured to:

receive, from a display apparatus, information indicative of a given gaze direction of a given eye of a user determined at a first time instant (T1);

generate at least one image frame according to the given gaze direction of the given eye, the at least one image frame being timestamped with a second time instant (T2) at which the rendering server generated the at least one image frame;

send the at least one image frame to the display apparatus for display thereat, the at least one image frame being sent at a fourth time instant (T4);

determine a time lag between any one of:
the first time instant (T1) and the second time instant (T2), or
the first time instant (T1) and the fourth time instant (T4);

detect whether or not the time lag exceeds a third predefined threshold;

when it is detected that the time lag exceeds the third predefined threshold, switch on a gaze-lock mode for the display apparatus;

select a forward line of vision of the user as a fixed gaze direction, for a given session of the gaze-lock mode; and generate a sequence of image frames according to the fixed gaze direction, instead of actual gaze directions of the given eye, during the given session of the gaze-lock mode; and send the sequence of image frames to the display apparatus for display thereat.

14. The rendering server of claim 13, further configured to, when it is detected that the time lag does not exceed the third predefined threshold, receive, from the display apparatus, information indicative of actual gaze directions of the given eye; and generate a sequence of image frames according to the actual gaze directions of the given eye.

15. The rendering server of claim 13, further configured to:

detect, after the gaze-lock mode is switched on, whether or not a current time lag exceeds a fourth predefined threshold; and when it is detected, after the gaze-lock mode is switched on, that the current time lag does not exceed the fourth predefined threshold, switch off the gaze-lock mode for the display apparatus and end the given session of the gaze-lock mode.

16. The rendering server of claim 13, further configured to switch on the gaze-lock mode for the display apparatus only when it is detected that the time lag has been exceeding the third predefined threshold over a predefined time period.

17. The rendering server of claim 13, further configured to employ a smoothening function to smoothen a transition from a current gaze direction of the given eye to the fixed gaze direction, wherein the smoothening function is employed over a first time period at a beginning of the given session of the gaze-lock mode.

18. The rendering server of claim 13, further configured to employ a smoothening function to smoothen a transition from the fixed gaze direction to a current gaze direction of the given eye, wherein the smoothening function is employed over a second time period prior to ending the given session of the gaze-lock mode.

19. A method implemented by a rendering server, the method comprising:

receiving, from a display apparatus, information indicative of a given gaze direction of a given eye of a user determined at a first time instant (T1);

generating at least one image frame according to the given gaze direction of the given eye, the at least one image frame being timestamped with a second time instant (T2) at which the rendering server generated the at least one image frame;

sending the at least one image frame to the display apparatus for display thereat, the at least one image frame being sent at a fourth time instant (T4);

determining a time lag between any one of:
the first time instant (T1) and the second time instant (T2), or
the first time instant (T1) and the fourth time instant (T4);

detecting whether or not the time lag exceeds a third predefined threshold;

when it is detected that the time lag exceeds the third predefined threshold, switching on a gaze-lock mode for the display apparatus;

selecting a forward line of vision of the user as a fixed gaze direction, for a given session of the gaze-lock mode; and generating a sequence of image frames according to the fixed gaze direction, instead of actual gaze directions of the given eye, during the given session of the gaze-lock mode; and sending the sequence of image frames to the display apparatus for display thereat.

20. The method of claim 19, further comprising, when it is detected that the time lag does not exceed the third predefined threshold, receiving, from the display apparatus, information indicative of the actual gaze directions of the given eye; and generating a sequence of image frames according to the actual gaze directions of the given eye.

21. The method of claim 19, further comprising:

detecting, after the gaze-lock mode is switched on, whether or not a current time lag exceeds a fourth predefined threshold; and when it is detected, after the gaze-lock mode is switched on, that the current time lag does not exceed the fourth predefined threshold, switching off the gaze-lock mode for the display apparatus and ending the given session of the gaze-lock mode.

22. The method of claim 19, further comprising switching on the gaze-lock mode for the display apparatus only when it is detected that the time lag has been exceeding the third predefined threshold over a predefined time period.

23. The method of claim 19, further comprising employing a smoothening function to smoothen a transition from a current gaze direction of the given eye to the fixed gaze direction, wherein the smoothening function is employed over a first time period at a beginning of the given session of the gaze-lock mode.

24. The method of claim 19, further comprising employ a smoothening function to smoothen a transition from the fixed gaze direction to a current gaze direction of the given eye, wherein the smoothening function is employed over a second time period prior to ending the given session of the gaze-lock mode.

* * * * *